No. 665,715. Patented Jan. 8, 1901.
C. F. ALLEN.
TIRE FOR VEHICLE WHEELS.
(Application filed Sept. 29, 1900.)
(No Model.)
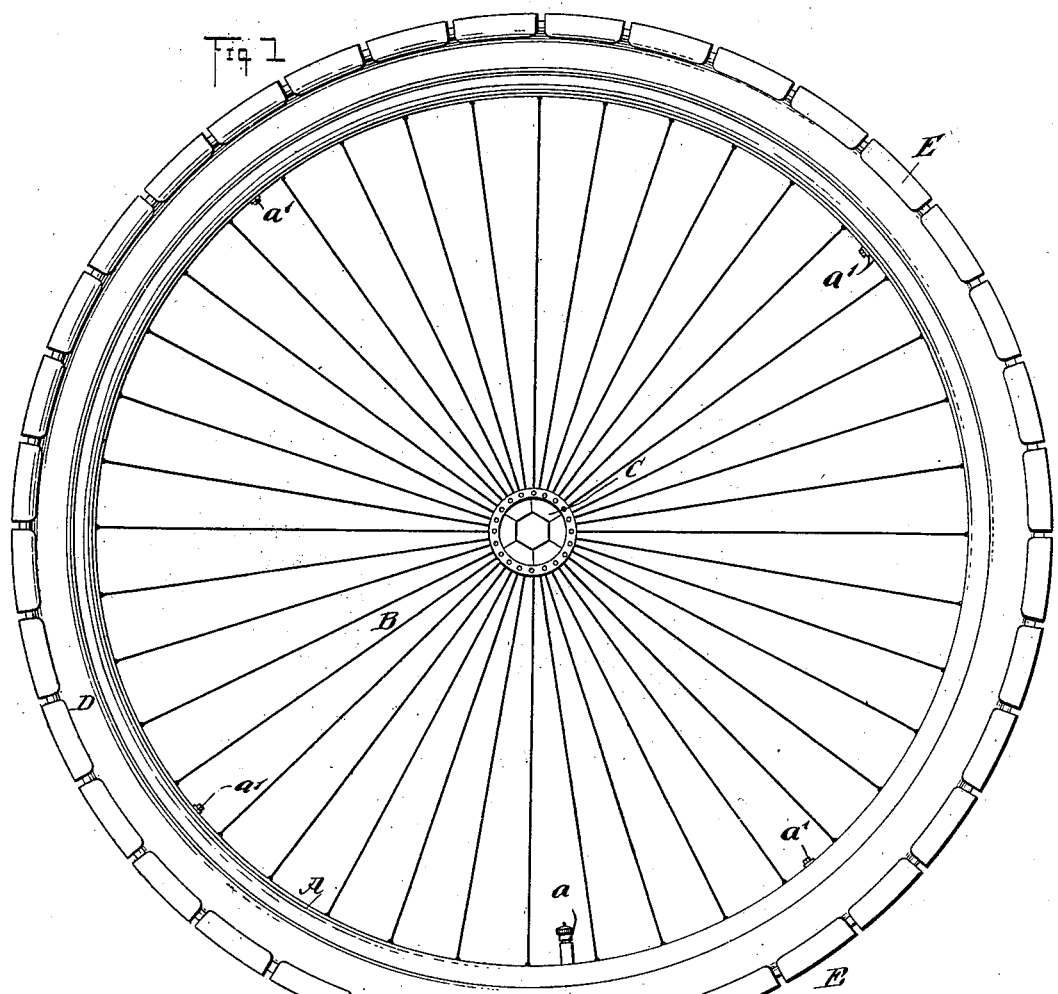
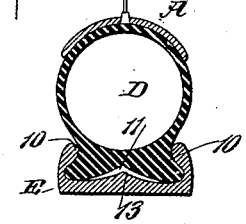
WITNESSES:
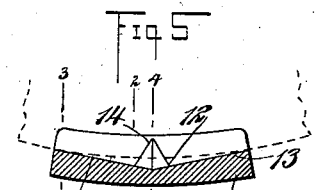
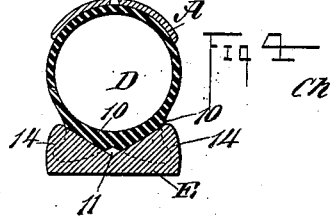
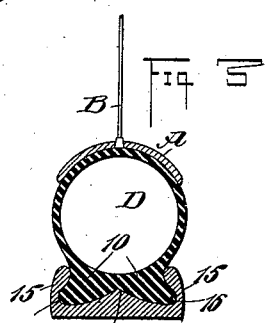
INVENTOR
Charles F. Allen.
BY
ATTORNEYS
THE NORRIS PETERS CO., PHOTO-LITHO., WASHINGTON, D. C.

United States Patent Office.

CHARLES F. ALLEN, OF HUENEME, CALIFORNIA, ASSIGNOR OF ONE-HALF TO LUNDY B. HOGUE AND WILLIAM C. HEWITT, OF SANTA PAULA, CALIFORNIA.

TIRE FOR VEHICLE-WHEELS.

SPECIFICATION forming part of Letters Patent No. 665,715, dated January 8, 1901.

Application filed September 29, 1900. Serial No. 31,508. (No model.)

*To all whom it may concern:*

Be it known that I, CHARLES F. ALLEN, a citizen of the United States, and a resident of Hueneme, in the county of Ventura and State of California, have invented a new and Improved Tire for Vehicle-Wheels, of which the following is a full, clear, and exact description.

The purpose of the invention is to provide an improved construction of pneumatic tires for motor-carriages and traction and other conveyances in which an outer metallic or non-puncturable sectional tire engages with the ground and serves as a guard or protector for the pneumatic section, to which it may be quickly and readily applied and from which it may be as conveniently removed.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a vehicle-wheel and the improved tire applied thereto. Fig. 2 is a transverse section through the rim of the wheel and the complete tire, the section being taken practically on the line 2 2 of Fig. 5. Figs. 3 and 4 are similar sections taken practically and respectively on the lines 3 3 4 4 of Fig. 5, and Fig. 5 is a central longitudinal section through one of the parts of the outer or protective tire.

A represents the rim of a wheel; B, the spokes; C, the hub; D, the pneumatic tire carried by the rim, and E a protective tire for the pneumatic tire.

The pneumatic tire D is secured to the rim A in any suitable or approved manner, and at the outer peripheral portion of the pneumatic tire D lips 10 are formed integral with the tire and preferably of the same material. These lips are placed transversely opposite, and each lip is continuous, being of circular formation. The lips 10 are curved in opposite directions outward from the center of the outer peripheral portion of the tire, as is shown in Figs. 2 and 3, and an angular or substantially V-shaped depression 11 is formed between the lips, as is best shown in Figs. 2 and 3.

The sections of the outer or protective tire E are made of metal. If, for example, the wheel is a large wheel and is to sustain heavy weight, the sections of the protective may be drop-forged steel; but such light metal as aluminium may be used, if desired. The sections of the protective tire E may be of any length or width, but usually they are from two to five inches long.

A depression 12 is made at the central portion of the inner peripheral surface of each section of the protective tire E, the depression being angular, and the said peripheral portion of a section increases gradually in thickness from the center in direction of its ends, and on the inner peripheral face of each section a longitudinal angular rib 13 is formed, diminishing as it reaches the central depression 12, and at each side of each section, upon the inner face of said side, a triangular offset 14 is formed, as shown in full lines in Fig. 4 and dotted lines in Fig. 5, and these offsets may be at the central portion of the central depression 12. The offsets 14 of a section of the tire E are adapted to enter slots or openings made transversely in the lips 10 of the pneumatic tire D and serve to prevent the sections from creeping. At the end portions of the sections the longitudinal ribs 13 fit into the depressions 11 between the lips 10; but such engagement does not take place near the center of a section, as shown in Figs. 2 and 4, thus providing a space which is to be filled with plumbago in order to prevent the sections of the metal protective tire E from chafing the rubber portion of the tire.

The side portions 15 of the protective tire-sections are bent inward in direction of each other, as shown in Figs. 2 and 3, and longitudinal recesses are made in the inner faces of the side walls of the sections, so that the side walls of the said sections will closely fit to the outer contour of the lips 10, and when the pneumatic tire D is inflated the lips 10 will retain the metallic sections of the tire E in position, it being understood that these sections are placed in position on the pneumatic tire when the tube is deflated, and the said tube is likewise deflated when the protective tire E is to be removed.

The inflating-valve $a$ may be of any construction and the pneumatic tire may be secured to the rim by the bolts and nuts $a'$, as shown in Fig. 1.

Having thus described my invention, I claim as new and desire to secure by Letters Patent—

1. A pneumatic tube having lips at its tread portion, a protective tire constructed of metal sections and having their inner faces conforming to the contour of the lips of the pneumatic tube, which lips serve to hold said sections of the protective tire on the tube, and an interlocking connection between each of said sections and the pneumatic tube to prevent said sections from creeping.

2. A pneumatic tube having lips at its tread portion curved outward in opposite directions, the said lips having openings therein at intervals, and a protective tire constructed of metal sections having their inner faces conforming to the contour of the lips of the pneumatic tube, the said metal sections being provided with lugs arranged to enter the openings in the lips of the tire.

3. The combination with a pneumatic tube having outwardly and oppositely curved lips formed upon its tread portion, an angular space being formed between the said lips, of a metallic protective tire consisting of a series of sections, the inner peripheral faces of said sections having angular longitudinal ribs formed thereon, and the side walls of said sections being inclined in direction of each other and shaped to conform to the side portions of said lips, as described.

4. The combination, with a pneumatic tire having peripheral lips at its tread-surface, curved in opposite directions, an angular space being formed between the said lips, the lips having openings therein at intervals, of a protective tire consisting of metal sections, each section comprising a peripheral surface whose inner face is depressed at its center and provided at the central portion with lugs arranged to enter the openings in the lips of the pneumatic tire, the inner face of the peripheral portion of a protective section having angular longitudinal ribs formed thereon, and the side walls of a protective section being inclined in direction of each other and shaped at their inner faces to conform to the side contours of the lips of the pneumatic tire, as set forth.

In testimony whereof I have signed my name to this specification in the presence of two subscribing witnesses.

CHARLES F. ALLEN.

Witnesses:
ED. BIRD,
E. H. DECKER.